United States Patent Office 3,524,880
Patented Aug. 18, 1970

3,524,880
PREPARATION OF PYRUVIC ACID
Lieng-Huang Lee, Midland, and Dan E. Ranck, Sanford, Mich., assignors to The Dow Chemical Company, Midland, Mich., a corporation of Delaware
No Drawing. Filed June 17, 1966, Ser. No. 558,277
Int. Cl. C07c 59/34
U.S. Cl. 260—526                                                4 Claims

ABSTRACT OF THE DISCLOSURE

The aqueous hydrolysis of 2,2-dichloropropionic acid provides good yields of pyruvic acid when the pH of the reaction mixture is maintained below 6. The reaction is carried out at 75–125° C., preferably in the presence of an alkali metal or alkaline earth metal compound as an acid acceptor.

---

This invention relates to a new and improved method for making pyruvic acid. It relates particularly to a method whereby 2,2-dichloropropionic acid is hydrolyzed to pyruvic acid under specified reaction conditions.

Pyruvic acid is a valuable chemical intermediate which is particularly useful in biochemical research. It is usually made by dehydrating and decarboxylating tartaric acid. This is an efficient and useful process, but the pyruvic acid thereby produced is necessarily relatively expensive. Pyruvic acid has been made in fairly good yields by boiling 2,2-dibromopropionic acid with aqueous alkali. However, the brominated acid is not an economically practical starting material. When the same hydrolysis procedure is applied to 2,2-dichloropropionic acid, the yield of pyruvic acid is low because of the formation of quantities of byproducts, particularly 2-chloroacrylic acid and its polymer. The yield is further reduced by condensation reactions and decomposition of the pyruvic acid product under the reaction conditions.

It has now been found that pyruvic acid can be prepared in realtively good yield from the cheap and readily available 2,2-dichloropropionic acid by reacting that acid with water and neutralizing the HCl thereby produced essentially as it is formed while maintaining the hydrolysis reaction mixture at a pH below about 6. Best yields are obtained by adding 2–2.9 molar equivalents of an acid acceptor such as a hydrolyzing base to an aqueous solution of 2,2-dichloropropionic acid at 75–125° C. and maintaining the pH of the reaction mixture below 6, preferably no higher than 3, by adding the acid acceptor at a rate no greater that the rate of hydrolysis of the chlorine atoms from the acid molecules. The pyruvic acid product can be separated from the reacted mixture by solvent extraction or other conventional means. Fractional distillation is a preferred method.

Water is the preferred aqueous medium for use in the process, but a mixture of water and a water-soluble solvent such as acetic acid, acetone, a lower alkanol, or other such solvent can be used. The process is preferably carried out under atmospheric pressure at the reflux temperature of the reaction mixture.

The acid acceptor is preferably a carbonate, hydroxide, or lower alkanoate of an alkali metal or an alkaline earth metal, most desirably one of these which is at least moderately soluble in water. A mixture of two or more such bases can also be employed. Suitable acid acceptors include sodium hydroxide, potassium bicarbonate, calcium hydroxide, barium hydroxide, lithium propionate, sodium acetate, calcium formate, strontium hydroxide, and the like.

Under conditions as specified above, the reaction is ordinarily substantially complete in 1–10 hours. Yields of up to about 85 percent of pyruvic acid, based on the hydrolyzed 2,2-dichloropropionic acid, are found in the reaction mixtures, and yields of pure pyruvic acid of 50–60 percent of the theoretical are obtainable by fractional distillation of such mixtures. This process is also advantageous in that a purified starting material is not required, for about as good results are obtained with a technical grade of dichloropropionic acid. The minor proportions of other chlorinated propionic acids and chlorinated acetic acids normally present in such material do not interfere significantly.

EXAMPLE 1

A solution of 429 g. of 90 percent 2,2-dichloropropionpropionic acid in 100 ml. of water was prepared in a reaction flask. The solution was heated to its reflux temperature and 3500 g. of 10 percent aqueous NaOH was added dropwise with stirring in about 3 hours, a molar ratio of base to acid of 2.5 to 1. The reaction mixture remained at pH 1–3 throughout the addition, the final reaction mixture having a pH of about 2.5. The reaction mixture was cooled and distilled under reduced pressure to remove most of the water. Dilute sulfuric acid was added to the resulting slurry of salt to make it strongly acid and this mixture was then distilled at about 5 mm. to obtain 125 g. of pure distilled pyruvic acid, a yield of purified product of about 45 percent based on the starting dichloropropionic acid.

EXAMPLE 2

The procedure of Example 1 was followed using the same molar proportions of reactants but using sodium acetate in place of sodium hydroxide. Essentially the same yield of distilled pyruvic acid was obtained.

EXAMPLE 3

A solution of 429 g. of 90 percent 2,2-dichloropropionic acid in 100 ml. of water was heated to reflux temperature and 10 percent aqueous sodium hydroxide was added to a total of 2.7 gram moles of NaOH per mole of dichloropropionic acid. The pH of the reaction mixture was maintained below 3 during the addition and the final mixture had a pH of 3. Upon working up the reaction mixture as in Example 1, a 53 percent yield of distilled pyruvic acid was obtained based on the starting dichloropropionic acid. When proportions of reactants as shown in Examples 1 and 3 were initially combined by conventional procedure and such a mixture was heated at reflux temperature until hydrolysis was substantially complete, only about 22 percent of the theoretical quantity of pyruvic acid could be isolated from the reaction mixture. In this latter mode of operation, the pH of the reaction mixture ranged from an initial value of 12–14 to about 3 at the end of the hydrolysis. Considerable 2-chloroacrylic acid and its polymer were formed.

We claim:
1. A process for making pyruvic acid which comprises reacting 2,2-dichloropropionic acid with water and main- taining the reaction mixture at a pH below 6 at a temperature of 75–125° C. while neutralizing the hydrogen chloride thereby produced essentially as it is formed.

2. The process of claim 1 when carried out in the presence of 2–2.9 mole equivalents of an acid acceptor per mole of 2,2-dichloropropionic acid.

3. The process of claim 2 wherein the acid acceptor is at least one of a water-soluble carbonate, hydroxide, or lower alkanoate of an alkali metal or an alkaline earth metal.

4. The process of claim 3 wherein the pyruvic acid is separated from the reaction mixture by fractional distillation.

References Cited

Brewster: "Organic Chemistry," 2nd ed., p. 147, Prentice-Hall (Englewood Cliffs, N.J.).

Organic Syntheses, coll. vol. II, pp. 244–5 (1943).

LORRAINE A. WEINBERGER, Primary Examiner

D. E. STENZEL, Assistant Examiner